US012535814B2

(12) United States Patent
Jikuhara et al.

(10) Patent No.: US 12,535,814 B2
(45) Date of Patent: Jan. 27, 2026

(54) INFORMATION PROCESSING DEVICE, INFORMATION PROCESSING SYSTEM, INFORMATION PROCESSING METHOD, AND TERMINAL DEVICE

(71) Applicant: TOYOTA JIDOSHA KABUSHIKI KAISHA, Aichi-ken (JP)

(72) Inventors: Yoshikazu Jikuhara, Miyoshi (JP); Jun Hioki, Nagakute (JP); Kaori Yamada, Nagakute (JP); Maiko Watanabe, Nagoya (JP); Yuki Kuwayama, Yokohama (JP); Shunya Maruta, Tokyo (JP); Yo Okumura, Chofu (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 247 days.

(21) Appl. No.: 18/346,269

(22) Filed: Jul. 3, 2023

(65) Prior Publication Data

US 2024/0012418 A1 Jan. 11, 2024

(30) Foreign Application Priority Data

Jul. 5, 2022 (JP) .................... 2022-108530

(51) Int. Cl.
*G05D 1/00* (2024.01)
*G06Q 10/083* (2023.01)

(52) U.S. Cl.
CPC ......... *G05D 1/0212* (2013.01); *G05D 1/0016* (2013.01); *G06Q 10/083* (2013.01)

(58) Field of Classification Search
CPC .. G05D 1/0212; G05D 1/0016; G06Q 10/083; G06Q 10/08; G06Q 10/06311
USPC .......................................... 701/25
See application file for complete search history.

(56) References Cited

U.S. PATENT DOCUMENTS

| 10,769,588 B1* | 9/2020 | Kim ................. H04N 21/44222 |
| 10,891,583 B1* | 1/2021 | Minh ................. G06Q 10/0835 |
| 11,868,934 B1* | 1/2024 | Mandal ................. G06N 20/10 |
| 2008/0082424 A1* | 4/2008 | Walton ............... G06Q 30/0601 705/26.1 |
| 2015/0120094 A1* | 4/2015 | Kimchi ................. B64U 10/14 701/3 |

(Continued)

FOREIGN PATENT DOCUMENTS

DE 102016009572 A1 11/2017
JP H08-115495 A 5/1996

(Continued)

*Primary Examiner* — Tuan C To
*Assistant Examiner* — Dominick Mulder
(74) *Attorney, Agent, or Firm* — HAUPTMAN HAM, LLP

(57) ABSTRACT

The information processing device includes a control unit that manages a logistics robot that delivers a package from an intermediate delivery point to a living place of each of a plurality of users. The control unit estimates the time at which the logistics robot completes the delivery of the first package to the first user based on the information on the undelivered package existing at the intermediate delivery point at the time at which the first package arrives at the intermediate delivery point and the delivery capability of the logistics robot. The control unit outputs the estimated time to the terminal device of the first user.

20 Claims, 8 Drawing Sheets

(56) References Cited

U.S. PATENT DOCUMENTS

| | | | |
|---|---|---|---|
| 2015/0262121 A1* | 9/2015 | Riel-Dalpe | G06Q 50/12 |
| | | | 705/15 |
| 2015/0363843 A1* | 12/2015 | Loppatto | G06Q 30/0283 |
| | | | 705/330 |
| 2015/0379468 A1 | 12/2015 | Harvey | |
| 2016/0104111 A1* | 4/2016 | Jones | G06Q 30/0611 |
| | | | 705/26.4 |
| 2016/0371628 A1* | 12/2016 | Wilkinson | G06Q 10/083 |
| 2016/0371642 A1* | 12/2016 | Wilkinson | G06Q 10/0832 |
| 2017/0046658 A1* | 2/2017 | Jones | G06Q 10/083 |
| 2017/0154347 A1* | 6/2017 | Bateman | G06Q 10/067 |
| 2018/0240066 A1* | 8/2018 | Streebin | G06Q 10/0832 |
| 2019/0220803 A1* | 7/2019 | Kanaoka | G07C 9/00571 |
| 2019/0236741 A1 | 8/2019 | Bowman et al. | |
| 2019/0244167 A1* | 8/2019 | Kaneko | G06Q 10/0833 |
| 2021/0256472 A1* | 8/2021 | Javidan | H04W 4/025 |
| 2021/0300553 A1* | 9/2021 | Exner | G05D 1/667 |
| 2021/0319398 A1* | 10/2021 | Streebin | G06Q 10/0833 |

FOREIGN PATENT DOCUMENTS

| | | |
|---|---|---|
| JP | 2018-045633 A | 3/2018 |
| JP | 2020-514203 A | 5/2020 |
| JP | 2020-160524 A | 10/2020 |
| JP | 2021-033581 A | 3/2021 |
| WO | 2018/094286 A1 | 5/2018 |

* cited by examiner

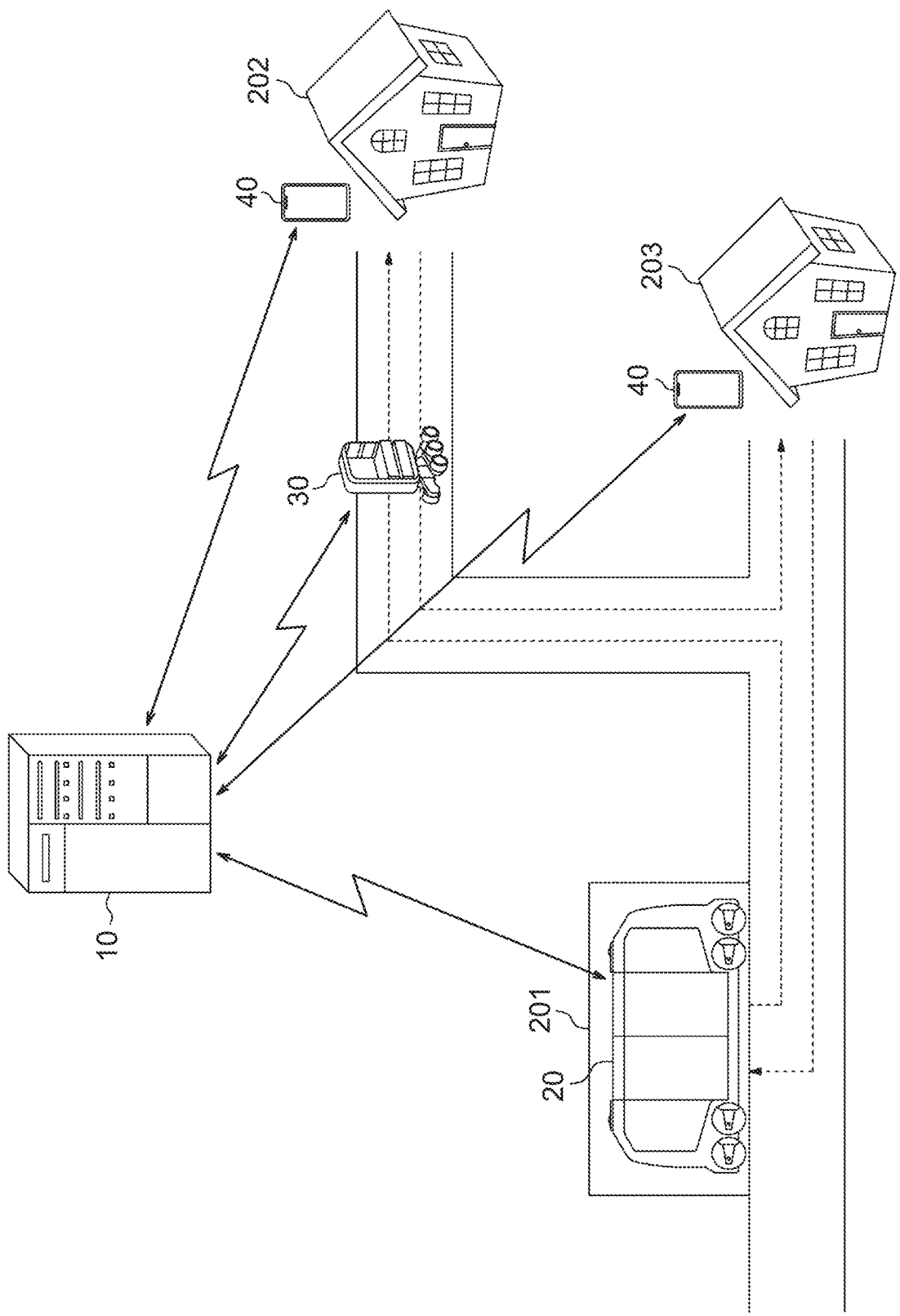

INFORMATION PROCESSING DEVICE, INFORMATION PROCESSING SYSTEM, INFORMATION PROCESSING METHOD, AND TERMINAL DEVICE

CROSS-REFERENCE TO RELATED APPLICATION

This application claims priority to Japanese Patent Application No. 2022-108530 filed on Jul. 5, 2022 incorporated herein by reference in its entirety.

BACKGROUND

1. Technical Field

The present disclosure relates to an information processing device, an information processing system, an information processing method, and a terminal device.

2. Description of Related Art

In recent years, a technique related to a delivery by a logistics robot (small robot vehicle) has been studied. For example, US 2015/0379468 A discloses a technique for delivering a parcel in two stages. A first vehicle is designed for operation in a public road system and delivers the parcel to a transfer point based on address information from a carrier. Next, the parcel is then transferred to a second vehicle for delivery to a final delivery point. The second vehicle is autonomous and suitable for use in a location remote from the public road or in a narrow location. One or more second vehicles complete delivery of the parcel to the final delivery point based on detailed information of a delivery segment provided from a location controller of the area.

SUMMARY

In a conventional technique related to delivery by a logistics robot, in the case where the number of the second vehicles is limited, delivery to a user (a recipient of a package) may be delayed from a scheduled time even when the package is delivered to the transfer point at the scheduled time. Delay in delivery deteriorates the convenience of the user who receives the package.

An object of the present disclosure made in view of such circumstances is to improve the convenience of a user who receives a package.

An information processing device according to an embodiment of the present disclosure includes a control unit that manages a logistics robot that delivers a package from an intermediate delivery point to a residence of each of a plurality of users. The control unit estimates a time at which the logistics robot completes delivery of a first package to a first user based on information on an undelivered package present at the intermediate delivery point at a time at which the first package arrives at the intermediate delivery point and a delivery capability of the logistics robot. The control unit outputs the estimated time to a terminal device of the first user.

An information processing system according to an embodiment of the present disclosure includes: the information processing device above; the logistics robot that delivers the undelivered package present at the intermediate delivery point to the user; and a terminal device that displays an estimation result of the time at which the logistics robot completes the delivery of the first package, the estimation result being output from the information processing device.

Further, an information processing method according to an embodiment of the present disclosure is executed by an information processing device that manages a logistics robot that delivers a package from an intermediate delivery point to a residence of each of a plurality of users. The information processing method includes estimating a time at which the logistics robot completes delivery of a first package to a first user based on information on an undelivered package present at the intermediate delivery point at a time at which the first package arrives at the intermediate delivery point and a delivery capability of the logistics robot. The information processing method includes outputting an estimation result of the time at which the logistics robot completes the delivery of the first package to the first user to a terminal device of the first user.

Further, a terminal device according to an embodiment of the present disclosure is carried by a first user. The terminal device includes a control unit. The control unit acquires, from an information processing device that manages a logistics robot that delivers a package from an intermediate delivery point to a residence of each of a plurality of users, an estimation result of estimating a time at which the logistics robot completes delivery of a first package to the first user based on information on an undelivered package present at the intermediate delivery point at a time at which the first package arrives at the intermediate delivery point and a delivery capability of the logistics robot. The control unit causes an output unit to display the estimation result acquired.

According to an embodiment of the present disclosure, the convenience of the user who receives the package can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a diagram illustrating a concept of a delivery mode of a package in an information processing system according to another embodiment.

DETAILED DESCRIPTION OF EMBODIMENTS

Hereinafter, an embodiment of the present disclosure will be described.

Outline of Embodiment

Figure 1:
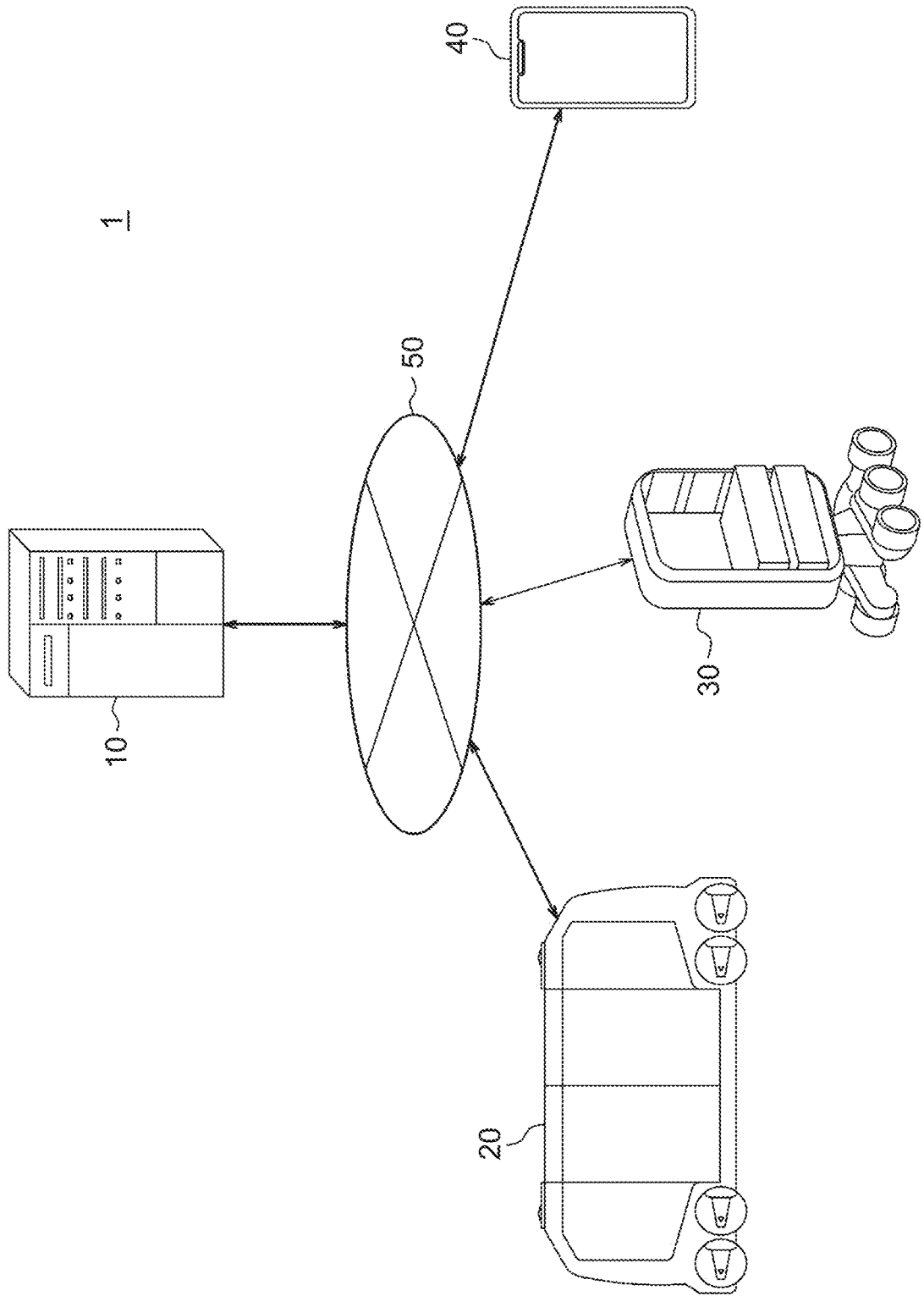
FIG. 1 is a block diagram illustrating a schematic configuration of an information processing system according to an embodiment.

As illustrated in FIG. 1, an information processing system 1 according to an embodiment of the present disclosure includes an information processing device 10 and a logistics robot 30. The information processing system 1 further includes a vehicle 20, although it is not essential. The information processing system 1 further includes a terminal device 40, although it is not essential. The information processing device 10, the vehicle 20, the logistics robot 30, and the terminal device 40 are communicably connected to each other via a network 50 including, for example, the Internet and a mobile communication network.

In FIG. 1, for the sake of simplicity of explanation, the number of the information processing devices 10, the vehicle 20, the logistics robot 30, and the terminal devices 40 included in the information processing system 1 is one, but is not limited thereto. The information processing system 1 may include two or more information processing devices 10. The number of the vehicles 20, the logistics robots 30, and the terminal devices 40 included in the information processing system 1 may be two or more, and may be arbitrarily determined.

The information processing device 10 is, for example, a computer such as a server device. For example, the information processing device 10 is a server belonging to a cloud computing system or another computing system. Note that the information processing device 10 is not limited thereto, and may be any general-purpose electronic device such as a Personal Computer (PC, or may be another electronic device dedicated to the information processing system 1. The information processing device 10 is capable of communicating with the vehicle 20, the logistics robot 30, and the terminal device 40 via the network 50. In the present embodiment, the information processing device 10 manages delivery of a package.

The vehicle 20 is, for example, an automobile, but is not limited thereto, and may be any vehicle. Motor vehicles include, but are not limited to, for example, gasoline-powered vehicles, Battery Electric Vehicle (BEV), Hybrid Electric Vehicle (HEV), Plug-in Hybrid Electric Vehicle (PHEV), or Fuel Cell Electric Vehicle (FCEV). In addition, the vehicle 20 may be a manned vehicle or an arbitrary autonomous driving vehicle that travels unmanned.

In the present embodiment, the vehicle 20 has a function of traveling on a public road, delivering a package to be delivered to an intermediate delivery point, and delivering the package to the logistics robot 30. The intermediate delivery point is a place where the package is delivered from the vehicle 20 to the logistics robot 30. Specifically, the intermediate delivery point may include a standby location of the logistics robot in the apartment house, or may include an intermediate collection and delivery station for delivery.

Logistics robot 30 is a robot that delivers packages autonomously and unattended. The logistics robot 30 may include, for example, any delivery vehicle that moves between points by autonomous driving, and may be positioned as a second vehicle with respect to the vehicle 20. The logistics robot 30 may be an in-hall logistics robot that is permanently installed in a delivery destination apartment house (such as a condominium or an apartment house) and specializes in delivering a package to each house in the apartment house. The logistics robot 30 may also be carried by the vehicle 20 to an intermediate delivery point. Further, the logistics robot 30 is not limited to a vehicle, and may be a humanoid robot or an arbitrary flying object (drone) that flies autonomously.

The logistics robot 30 autonomously delivers the package to at least one delivery destination. Upon arriving at the delivery destination, the logistics robot 30 delivers the package addressed to the user as the recipient of the delivery destination to the user. The logistics robot 30 can perform other operations as necessary, such as when the user of the delivery destination cannot directly deliver the package to the user due to the absence or the like, transporting the package to the instructed place, or the like.

The terminal device 40 is any electronic device used by a user who receives a package. For example, a general-purpose electronic device such as a PC, a smart phone, or a tablet terminal, or a dedicated electronic device can be used as the terminal device 40.

Hereinafter, an outline of the present embodiment will be described. Details will be described later. The information processing device 10 notifies the terminal device 40 of the user of the delivery destination in advance that the package is delivered by the logistics robot 30. The information processing device 10 may estimate the time at which the logistics robot 30 completes the delivery of the package, and notify the terminal device 40 of the user of the delivery destination of the estimated delivery time in advance.

The user may input an instruction regarding the delivery of the package to the terminal device 40 based on the notified estimated delivery time. Specifically, the user may instruct the delivery of the package by the logistics robot 30, or may instruct the intermediate delivery point to receive the package by the user himself/herself. The information processing device 10 outputs an instruction of the delivery destination to the logistics robot 30, and causes the logistics robot 30 to deliver the package to the door (house) of the user who has instructed the delivery of the package by the logistics robot 30.

According to the information processing system 1 of the present embodiment, it is possible to determine whether the user instructs the delivery by the logistics robot 30 based on the notification of the estimated delivery time. By doing so, the convenience of the user receiving the package is improved. It can also be determined whether the user receives the package at the intermediate delivery point. In this way, the load on the logistics robot 30 can be reduced. By reducing the load on the logistics robot 30, delivery of the baggage to other users may be accelerated. As a result, convenience may be improved for the entire user receiving the package.

Hereinafter, each configuration of the information processing system 1 will be described in detail.

Configuration of Information Processing Device

Figure 2:
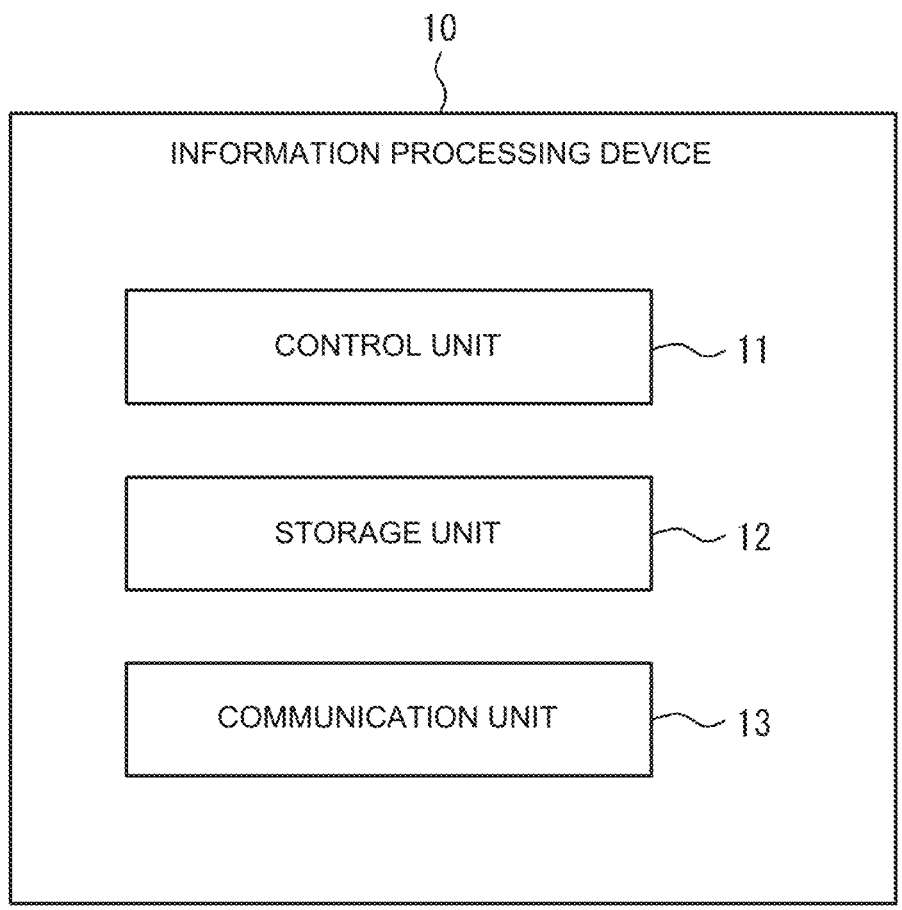
FIG. 2 is a block diagram illustrating a schematic configuration of an information processing device.

As illustrated in FIG. 2, the information processing device 10 includes a control unit 11, a storage unit 12, and a communication unit 13.

The control unit 11 includes at least one processor, at least one dedicated circuit, or a combination thereof. A processor is a general-purpose processor such as central processing unit (CPU) or graphics processing unit (GPU), or a special-purpose processor specialized for a particular process. The dedicated circuitry is, for example, field-programmable gate array (FPGA) or application specific integrated circuit (ASIC). The control unit 11 executes processing related to the operation of the information processing device 10 while controlling each unit of the information processing device 10.

The storage unit 12 includes at least one semiconductor memory, at least one magnetic memory, at least one optical memory, or a combination of at least two types thereof. Semiconductor memories are, for example, random access memory (RAM) or read only memory (ROM). RAM is, for example, static random access memory (SRAM) or dynamic random access memory (DRAM). ROM is, for example, electrically erasable programmable read only memory (EE-PROM). The storage unit 12 may function as, for example, a main storage device, an auxiliary storage device, or a cache memory. The storage unit 12 stores programs and data used for the operation of the information processing device 10 and data obtained by the operation of the information processing device 10. The information stored in the storage unit 12 may be updatable by, for example, information acquired from the network 50 via the communication unit 13.

The communication unit 13 includes at least one external communication interface connected to the network 50. The communication interface may be either a wired communication or a wireless communication interface. For wired communication, the communication interface is, for example, Local Area Network (LAN) interface, Universal Serial Bus (USB). For wireless communication, the communication interface is, for example, an interface corresponding to a mobile communication standard such as Long Term Evolution (LTE), $4^{th}$ generation (4G), or 5' generation (5G), or an interface corresponding to short-range wireless communication such as Bluetooth. The communication unit 13 receives data used for the operation of the information processing device 10, and outputs data obtained by the operation of the information processing device 10 to an external device such as the logistics robot 30 or the terminal device 40.

The information processing device 10 may further include an input unit and an output unit. That is, in addition to receiving (inputting) and transmitting (outputting) information via the communication unit 13, information may be input and output by an input unit and an output unit included in the information processing device 10.

The function of the information processing device 10 is realized by executing the program according to the information processing method of the present embodiment by a processor corresponding to the control unit 11. That is, the functions of the information processing device 10 are realized by software. The program causes the computer to execute the operation of the information processing device 10, thereby causing the computer to function as the information processing device 10. That is, the computer functions as the information processing device 10 by executing the operation of the information processing device 10 in accordance with the program.

In the present embodiment, the program can be recorded in a computer-readable recording medium. The computer-readable recording medium includes a non-transitory computer-readable medium such as a magnetic recording device, an optical disc, a magneto-optical recording medium, or a semiconductor memory. Distribution of the program is performed, for example, by selling, transferring, or lending a portable recording medium such as a digital versatile disc (DVD) or a compact disc read only memory (CD-ROM in which the program is recorded. Further, the program may be distributed by storing the program in the storage of the external server and transmitting the program from the external server to another computer. Further, the program may be provided as a program product.

Configuration of the Vehicle 20

Figure 3:
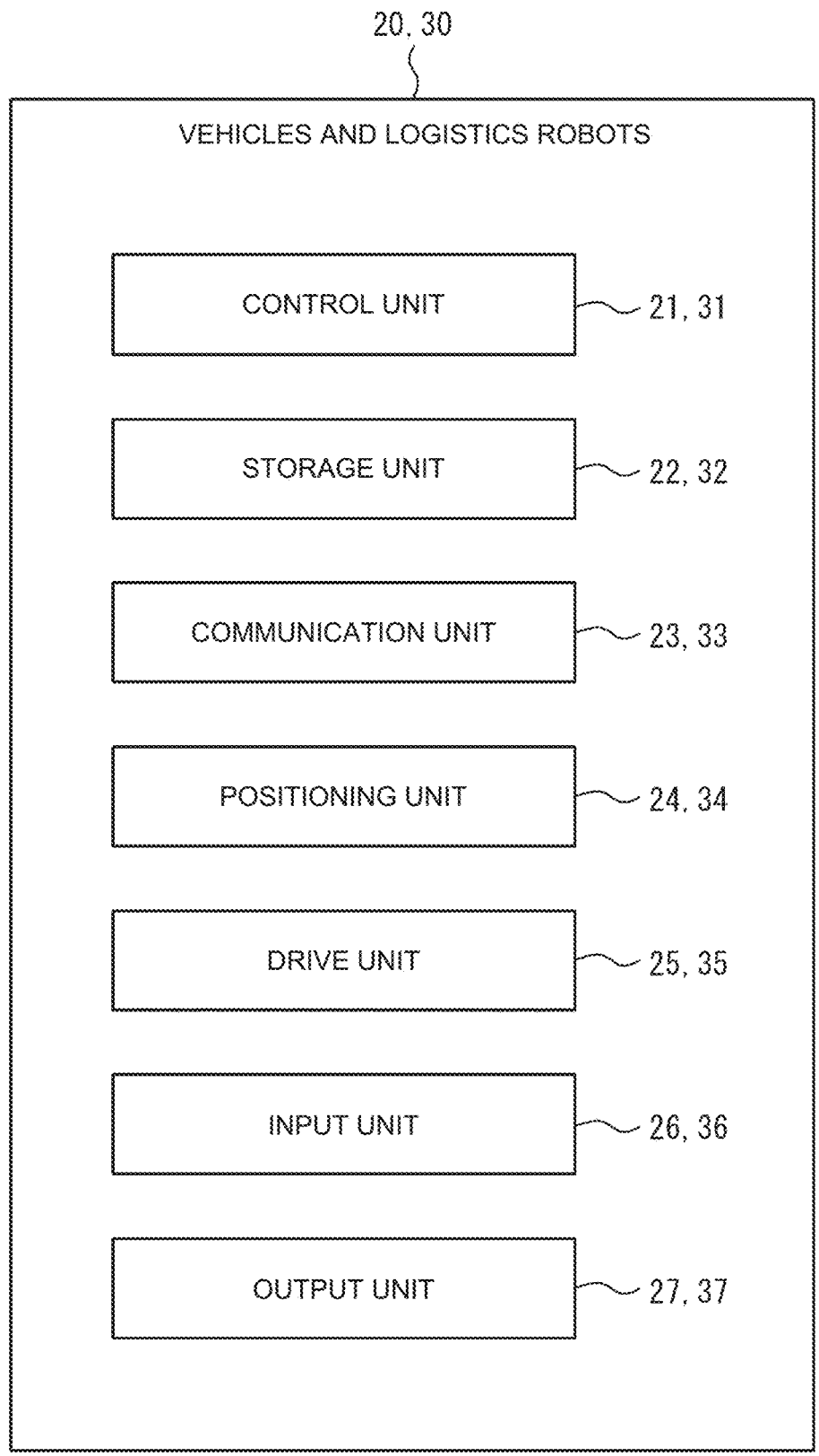
FIG. 3 is a block diagram illustrating a schematic configuration of a vehicle and a logistics robot.

As illustrated in FIG. 3, the vehicle 20 includes a control unit 21, a storage unit 22, a communication unit 23, a positioning unit 24, a drive unit 25, an input unit 26, and an output unit 27. In the present embodiment, it is assumed that the vehicle 20 and the logistics robot 30 have a common configuration. Hereinafter, the vehicle 20 and the logistics robot 30 will be described with reference to the same drawings (FIG. 3).

The control unit 21 includes at least one processor, at least one dedicated circuit, or a combination thereof. The processor may include a general-purpose processor, such as a CPU or GPU, or a special-purpose processor specialized for a particular process. The dedicated circuit may include, for example, an FPGA or an ASIC. The control unit 21 executes processing related to the operation of the vehicle 20 while controlling each unit of the vehicle 20.

The storage unit 22 includes one or more memories. The memories are, for example, a semiconductor memory, a magnetic memory, or an optical memory, but are not limited to these memories. Each memory included in the storage unit 22 may function as, for example, a main storage device, an auxiliary storage device, or a cache memory. The storage unit 22 stores any information used for the operation of the vehicle 20. For example, the storage unit 22 may store a system program, an application program, and embedded software. The information stored in the storage unit 22 may be updatable by, for example, information acquired from the network 50 via the communication unit 23.

The communication unit 23 includes at least one external communication interface connected to the network 50. The communication interface is, for example, an interface compatible with a mobile communication standard such as LTE, 4G or 5G, or an interface compatible with near field communication such as Bluetooth (registered trademark), but is not limited thereto. The communication unit 23 receives data used for the operation of the vehicle 20, and transmits data obtained by the operation of the vehicle 20 to the outside (for example, the information processing device 10).

The positioning unit 24 includes one or more devices that acquire position information of the vehicle 20. Specifically, the positioning unit 24 includes, for example, a receiver corresponding to Global Positioning System (GPS), but is not limited thereto, and may include a receiver corresponding to any satellite-based positioning system. The positioning unit 24 may constantly acquire the position information of the vehicle 20, or may periodically or non-periodically acquire the position information.

The drive unit 25 includes a driving mechanism for moving or traveling the vehicle 20. The drive unit 25 also includes any drive mechanism that enables loading of a load on the vehicle 20, transfer of a load loaded on the vehicle 20 to the logistics robot 30, and unloading of a load loaded on the vehicle 20 to a designated location. For example, the drive unit 25 includes at least one of an arm mechanism driven by a motor and a slide mechanism capable of linearly sliding a load.

The input unit 26 includes means for inputting information to the vehicle 20. For example, the input unit 26 includes any imaging module capable of imaging the surroundings of the vehicle 20. The imaging module may include one or more cameras. Each camera may be positioned at an appropriate position of the vehicle 20 so as to be able to image the surroundings of the vehicle 20. The input unit 26 may include a voice recognition function together with a voice information input unit. Without being limited thereto, the input unit 26 may include any means for acquiring information about the surroundings of the vehicle 20.

The output unit 27 includes at least one output interface. The output interface is, for example, a display for outputting information in video, a speaker for outputting information in audio, or the like. The display is, for example, a liquid crystal display (LCD) or an organic electro luminescence display. The output unit 27 displays and outputs data received from the information processing device 10, data obtained by the operation of the vehicle 20, and the like.

Configuration of the Logistics Robot 30

As illustrated in FIG. 3, the logistics robot 30 includes a control unit 31, a storage unit 32, a communication unit 33, a positioning unit 34, a drive unit 35, an input unit 36, and an output unit 37. As described above, in the present embodiment, the configuration of the logistics robot 30 is basically the same as the configuration of the vehicle 20. Therefore, the configuration of the logistics robot 30 will be described with reference to the same drawings (FIG. 3) as the description of the configuration of the vehicle 20. In the description of the configuration of the logistics robot 30, the description that overlaps with the description of the configuration of the vehicle 20 is simplified.

The control unit 31 includes at least one processor, at least one dedicated circuit, or a combination thereof. The processor is a general-purpose processor such as a CPU or a GPU, or a dedicated processor specialized for a specific process. The control unit 31 executes processing related to the operation of the logistics robot 30 while controlling each unit of the logistics robot 30.

The storage unit 32 includes one or more memories. The memory is, for example, a semiconductor memory, a magnetic memory, an optical memory, or the like. Each memory included in the storage unit 32 may function as, for example, a main storage device, an auxiliary storage device, or a cache memory. The storage unit 32 stores arbitrary information used for the operation of the logistics robot 30. For example, the storage unit 32 may store a system program, an application program, embedded software, and the like. The information stored in the storage unit 32 may be updatable by, for example, information acquired from the network 50 via the communication unit 33.

The communication unit 33 includes at least one external communication interface connected to the network 50. The communication interface is, for example, an interface compatible with a mobile communication standard such as LTE, 4G or 5G, or an interface compatible with near field communication such as Bluetooth (registered trademark), but is not limited thereto. The communication unit 33 receives data used for the operation of the logistics robot 30, and outputs data obtained by the operation of the logistics robot 30 to an external device such as the information processing device 10.

The positioning unit 34 includes one or more devices that acquire position information of the logistics robot 30. Specifically, the positioning unit 34 includes, for example, a receiver corresponding to GPS, but is not limited thereto. The positioning unit 34 may constantly acquire the position information of the logistics robot 30, or may periodically or non-periodically acquire the position information.

The drive unit 35 includes a driving mechanism related to movement or travel of the logistics robot 30. The drive unit 35 also includes any drive mechanism that enables loading of a load on the logistics robot 30, delivery of a load loaded on the logistics robot 30 to a user, and unloading of a load loaded on the logistics robot 30 to a designated location. For example, the drive unit 35 includes at least one of an arm mechanism driven by a motor and a slide mechanism capable of linearly sliding a load.

The input unit 36 includes a means for inputting information to the logistics robot 30. For example, the input unit 36 includes any imaging module capable of imaging the surroundings of the logistics robot 30. The imaging module may include one or more cameras. Each camera may be located at an appropriate position of the logistics robot 30 so as to be able to image the surroundings of the logistics robot 30. Further, the imaging module preferably includes a function of reading a display of a delivery destination attached to the package. The input unit 36 may include a voice recognition function together with a voice information input unit. Without being limited to this, the input unit 36 may include any means for acquiring information around the logistics robot 30.

The output unit 37 includes at least one output interface. The output interface is, for example, a display for outputting information in video, a speaker for outputting information in audio, or the like. The display is, for example, an LCD or an organic EL display. The output unit 37 displays data received from the information processing device 10, data stored in the logistics robot 30, data obtained by the operation of the logistics robot 30, or the like, for example, to the user or outputs audio.

Configuration of the Terminal Device 40

Figure 4:
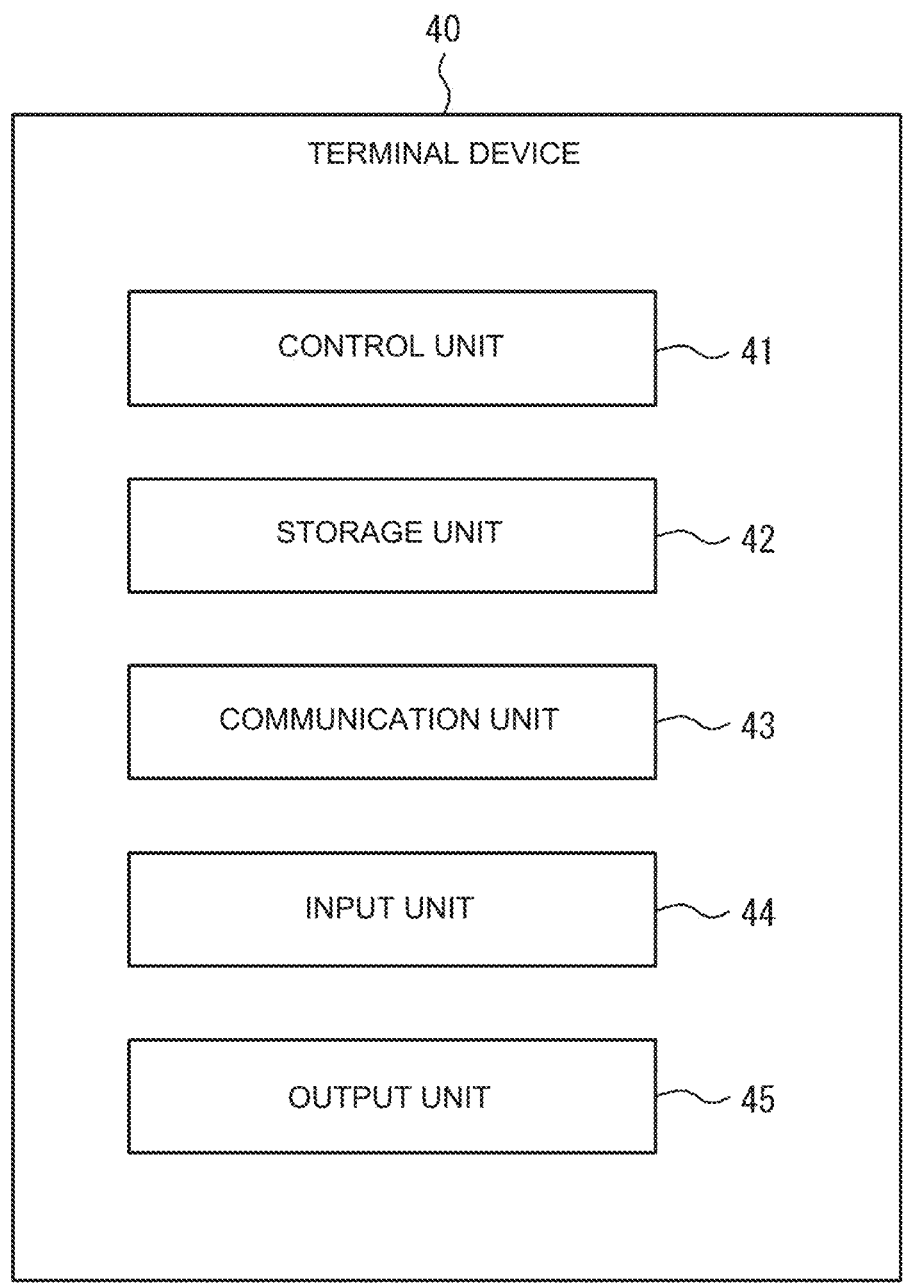
FIG. 4 is a block diagram illustrating a schematic configuration of a terminal device.

As illustrated in FIG. 4, the terminal device 40 includes a control unit 41, a storage unit 42, a communication unit 43, an input unit 44, and an output unit 45.

The control unit 41 includes at least one processor, at least one dedicated circuit, or a combination thereof. The processor is a general-purpose processor such as a CPU or a GPU, or a dedicated processor specialized for a specific process. The dedicated circuit is, for example, an FPGA or an ASIC. The control unit 41 performs processing related to the operation of the terminal device 40 while controlling the units of the terminal device 40.

The storage unit 42 includes at least one semiconductor memory, at least one magnetic memory, at least one optical memory, or a combination of at least two types of these memories. The semiconductor memory is, for example, a RAM or a ROM. The RAM is, for example, a static random access memory (SRAM) or a dynamic random access memory (DRAM). The ROM is, for example, an EEPROM. The storage unit 42 functions as, for example, a main storage device, an auxiliary storage device, or a cache memory. The storage unit 42 stores programs and data used for the operation of the terminal device 40 and data obtained by the operation of the terminal device 40. The information stored in the storage unit 42 may be updatable by, for example, information acquired from the network 50 via the communication unit 43.

The communication unit 43 includes at least one external communication interface connected to the network 50. The communication interface may be either a wired communication or a wireless communication interface. For wired communication, the communication interface is, for example, a LAN interface or a USB. For wireless communication, the communication interface is, for example, an interface compatible with a mobile communication standard such as LTE, 4G or 5G, or an interface compatible with short-range wireless communication such as Bluetooth (registered trademark). The communication unit 43 receives data used for the operation of the terminal device 40, and outputs data obtained by the operation of the terminal device 40 to an external device such as the information processing device 10.

The input unit 44 includes at least one input interface. The input interface may include, for example, a physical key such as a keyboard, a capacitive key, a pointing device, or a touch screen integrally provided with the display. Further, the input interface may include, for example, a microphone that accepts voice input, a camera that accepts gesture input, or the like. The input unit 44 receives an input operation to enter data used for the operation of the terminal device 40. Instead of being provided in the terminal device 40, the input unit 44 may be connected to the terminal device 40 as an external input device.

The output unit 45 includes at least one output interface. The output interface is, for example, a display for outputting information in video, a speaker for outputting information in audio, or the like. The display is, for example, an LCD or an organic EL display. The output unit 45 displays and outputs data received from the information processing device 10, data obtained by the operation of the terminal device 40, and the like. Instead of being provided in the terminal device 40, the output unit 45 may be connected to the terminal device 40 as an external output device.

Embodiment of Delivery to the Apartment House 100

Figure 5:
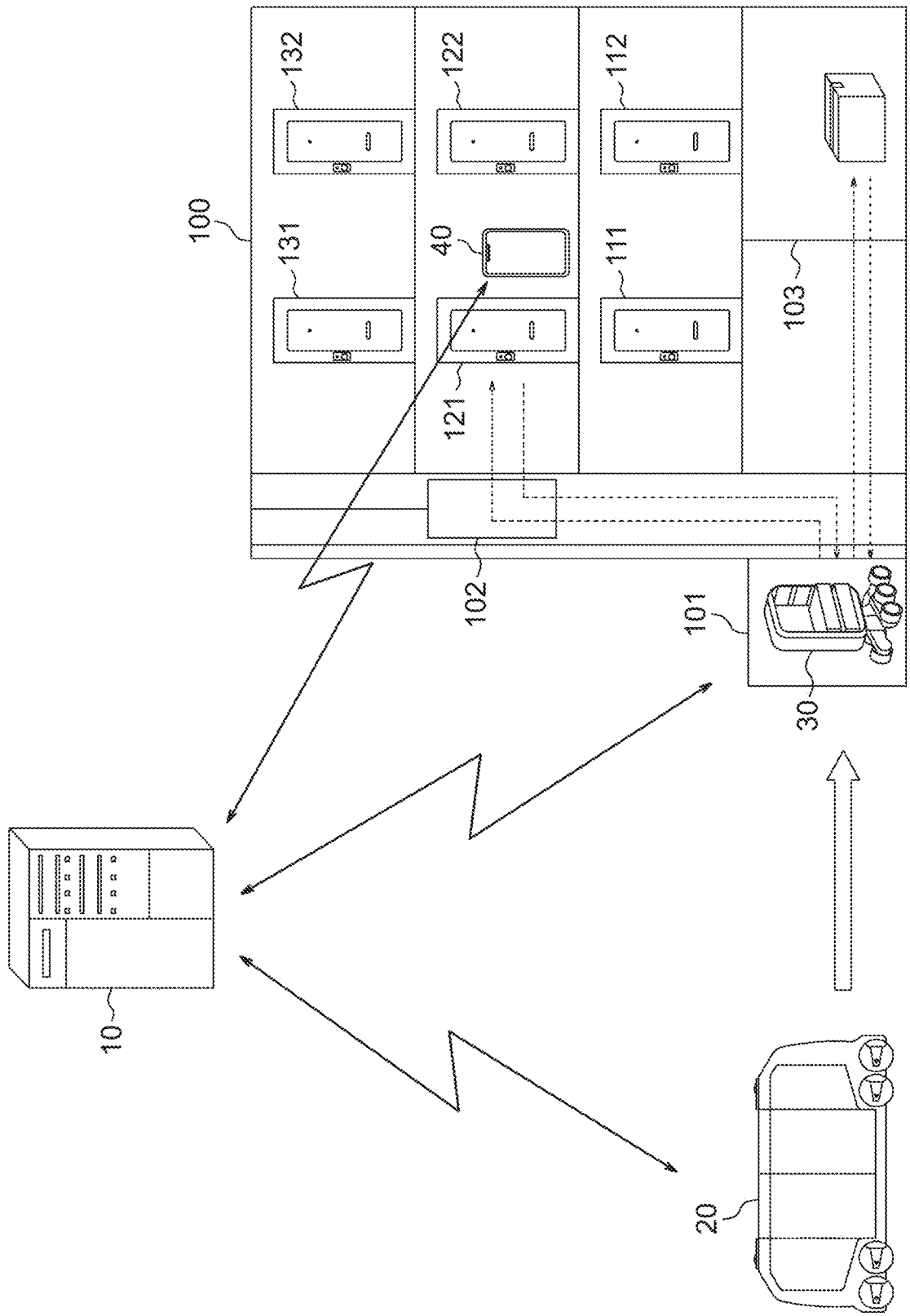
FIG. 5 is a diagram illustrating a concept of a delivery mode of a package in an information processing system according to an embodiment.

As illustrated in FIG. 5, the information processing system 1 according to an embodiment of the present disclosure delivers a package to the apartment house 100 by the vehicle 20, and delivers the package to each of a plurality of users whose residences are dwellings in the apartment house 100 by the logistics robot 30. The logistics robot 30 used in the apartment house 100 is also referred to as an in-hall logistics robot. The apartment house 100 may include an apartment or a condominium. The control unit 11 of the information processing device 10 manages the vehicle 20 and the logistics robot 30.

The apartment house 100 includes a standby space 101, an elevator 102, a temporary storage space 103, and a plurality of dwelling units 111, 112, 121, 122, 131, and 132. The standby space 101 is a place where the logistics robot 30 stands by. The elevator 102 allows the logistics robot 30 to move between the floors of the apartment house 100. The temporary storage space 103 is a place where the logistics robot 30 temporarily stores the package to be delivered to the user.

In the information processing system 1 illustrated in FIG. 5, it is assumed that the parcel is delivered to the standby space 101 by the vehicle 20 and is delivered from the vehicle 20 to the logistics robot 30. That is, the standby space 101 corresponds to an intermediate delivery point for delivering the package from the vehicle 20 to the logistics robot 30. The package delivered by the vehicle 20 to the intermediate delivery point may be delivered to the user by moving the logistics robot 30 from the intermediate delivery point to the user's residence (each dwelling unit). That is, the logistics robot 30 delivers the package from the intermediate delivery point to each of the plurality of users. The package delivered by the vehicle 20 to the intermediate delivery point may be stored at the intermediate delivery point, or may be moved to the temporary storage space 103 and stored. The temporary storage space 103 may be used as an intermediate delivery point.

Hereinafter, a procedure of delivering a package to a user living in the dwelling unit 121 in the apartment house 100 will be described.

Delivery of Luggage by Vehicle 20

The control unit 11 of the information processing device 10 instructs the vehicle 20 to deliver the package to the apartment house 100. On the basis of an instruction from the control unit 11, the vehicle 20 loads a package to be delivered to the apartment house 100 and moves to the apartment house 100. The package to be delivered to the apartment house 100 includes a package whose final delivery destination is a user of each dwelling unit of the apartment house 100. The vehicle 20 may load a package to a neighboring house to be delivered collectively, in addition to the package to be delivered to the apartment house 100. The vehicle 20 may be a manned traveling vehicle or an arbitrary autonomous driving vehicle that travels unmanned. The vehicle 20 may be configured to communicate information with the information processing device 10.

Calculating Estimated Delivery Time for a Baggage

The control unit 11 notifies the terminal device 40 of the user living in the dwelling unit 121, which is the final delivery destination of the package, in advance that the package is delivered by the logistics robot 30, regardless of whether the vehicle 20 is before delivering the package to the apartment house 100 or after delivering the package. The user living in the dwelling unit 121, which is the final delivery destination of the package, is also referred to as the first user. The package delivered to the first user is also referred to as a first package. Here, the description of "first" is merely an identifier for distinguishing the configuration from other configurations, and does not have any other special meaning. The first user and the first package may be referred to as a target user and a target package, respectively.

The control unit 11 estimates a time at which the delivery of the first package delivered from the vehicle 20 to the logistics robot 30 to the first user is completed. The time at which the logistics robot 30 is estimated as the time at which the delivery of the first package is completed is also referred to as the estimated delivery time. If the first package is delivered to the apartment house 100 by the vehicle 20, the control unit 11 calculates the estimated delivery time based on the information on the undelivered package existing at the intermediate delivery point at the time of performing the estimation and the delivery capability of the logistics robot 30 in the apartment house 100. The control unit 11 calculates the estimated delivery time on the basis of the information on the undelivered package existing at the intermediate delivery point at the time when the vehicle 20 arrives at the intermediate delivery point of the apartment house 100 and the delivery capability of the logistics robot 30 in the apartment house 100, if the package is before being delivered to the apartment house 100 by the vehicle 20.

In other words, the control unit 11 estimates the time at which the logistics robot 30 completes the delivery of the first package to the first user based on the information on the undelivered package existing at the intermediate delivery point at the time when the first package arrives at the intermediate delivery point and the delivery capability of the logistics robot 30.

The control unit 11 may acquire the number of packages stored at the intermediate delivery point as the information on the undelivered packages existing at the intermediate delivery point, or may acquire the size or weight of the packages. In addition, the control unit 11 may acquire information indicating the type of the package stored in the intermediate delivery point as the information on the undelivered package existing in the intermediate delivery point. The information indicating the type of the baggage may include information indicating that a temperature condition such as a refrigerated product or a frozen product is set, or may include information indicating that various precautions such as no use of a top or bottom, bending precautions, strict prohibition of loading, precautions to be taken, handling precautions, and water wetting precautions are set.

The control unit 11 may acquire, as the delivery capability of the logistics robot 30, the number of logistics robots 30 operating at the intermediate delivery point or the capacity of a load that the logistics robot 30 can load. The logistics robot 30 operating at the intermediate delivery point corresponds to the logistics robot 30 that is in a state in which the package can be delivered from the intermediate delivery point of the apartment house 100 to each dwelling unit. The control unit 11 may calculate an earlier time as the estimated delivery time as the number of the logistics robots 30 increases. The control unit 11 can calculate an earlier time as the estimated delivery time as the capacity of the cargo that the logistics robot 30 can load increases.

When the number of undelivered packages is large, the control unit 11 may determine the order of delivery and cause the logistics robot 30 to deliver the packages. That is, the control unit 11 may assign a priority order for delivering the package to the undelivered package existing at the intermediate delivery point. It is assumed that the control unit 11 causes the logistics robot 30 to deliver the parcel in an earlier order as the priority assigned to the parcel is higher. The control unit 11 may calculate the estimated delivery time based on the priority assigned to the package. The control unit 11 can calculate an earlier time as the estimated delivery time of the parcel as the higher the priority assigned to the parcel.

The control unit 11 may determine a priority order for delivering the package based on the information on the undelivered package. For example, the control unit 11 may assign a high priority to a package having a time designated as a delivery time among undelivered packages. For example, the control unit 11 may assign a high priority to a package for which a temperature condition such as a refrigerated product or a frozen product is set among undelivered packages.

The control unit 11 may estimate, as the delivery capability of the logistics robot 30, a time for the logistics robot 30 to move from the intermediate delivery point to each dwelling unit where the user of the delivery destination resides. That is, the control unit 11 may estimate the time for the logistics robot 30 to move from the intermediate delivery point to the residence of each of the plurality of users as the delivery destination. The control unit 11 may acquire, from another device, an estimated value of the time that the logistics robot 30 moves from the intermediate delivery point to the residence of each of the plurality of users of the delivery destination. The control unit 11 can calculate an earlier time as the estimated delivery time, as the time when the logistics robot 30 moves from the intermediate delivery point to each of the plurality of users of the delivery destination is shorter.

The control unit 11 may estimate the time that the logistics robot 30 moves from the intermediate delivery point to each dwelling unit in which the user of the delivery destination lives, based on the congestion state of the elevator 102 of the apartment house 100. The control unit 11 may estimate the time that the logistics robot 30 moves from the intermediate delivery point to each dwelling unit in which the user of the delivery destination resides, based on the congestion state of the passageway of each floor of the apartment house 100. The congestion status of the elevator 102 or the passageway may be quantified based on the population density of the logistics robot 30. The congestion state of the elevator 102 or the passage may be quantified based on a population density obtained by combining the logistics robot 30 and a person such as a resident of the apartment house 100. The control unit 11 may estimate, in a long time, the time during which the logistics robot 30 moves from the intermediate delivery point to the delivery destination dwelling unit as the population density of the range including the route in which the logistics robot 30 moves from the intermediate delivery point to the delivery destination dwelling unit increases.

The control unit 11 may set a route on which the logistics robot 30 can preferentially move in a route from the intermediate delivery point to the residence of each of the plurality of users so that the time for the logistics robot 30 to move from the intermediate delivery point to the residence of the delivery destination can be shortened. By doing so, the convenience of the user can be improved.

Processing for Estimated Delivery Times

The control unit 11 of the information processing device 10 outputs the estimated delivery time of the first package together with the prior notification of the delivery of the first package to the terminal device 40 carried by the first user.

The terminal device 40 displays a prior notification of delivery of the first package and an estimated delivery time of the first package. The first user may confirm the prior notification of the delivery and the estimated delivery time, and determine whether to wait for the first package to be delivered by the logistics robot 30. When the first user determines to wait for delivery of the first package by the logistics robot 30, the first user inputs a delivery instruction of the first package by the logistics robot 30 to the terminal device 40. The terminal device 40 outputs the delivery instruction of the first package by the logistics robot 30 to the information processing device 10. The control unit 11 causes the logistics robot 30 to deliver the first package.

If the first user does not wait for the first package to be delivered by the logistics robot 30 due to, for example, the estimated delivery time being slow, the first user may determine that the first user himself/herself receives the first package at the intermediate delivery point. In this case, the first user may input an instruction to stop the delivery of the first package by the logistics robot 30 to the terminal device 40, and may also input that the first user himself/herself receives the first package at the intermediate delivery point. The terminal device 40 outputs, to the information processing device 10, an instruction to stop the delivery of the first package by the logistics robot 30 and an instruction to store the first package at the intermediate delivery point. The control unit 11 controls the logistics robot 30 so that the first package is stored at the intermediate delivery point. The control unit 11 excludes the information on the first package received by the first user at the intermediate delivery point from the information on the undelivered package. In this way, delivery of other undelivered packages may be accelerated. In addition, the load on the logistics robot 30 can be reduced.

When the first user inputs an instruction to receive the first package at the intermediate delivery point, the control unit 11 may give an incentive to the first user. The control unit 11 may give an incentive to the first user when the first user actually receives the first package at the intermediate delivery point. The control unit 11 may output the incentive information to the terminal device 40 of the first user. The terminal device 40 of the first user may give an incentive to the first user based on the information of the incentive.

The incentive may include, for example, a discount on the delivery fee of the package, or may include a cashback of the delivery fee. The incentive may include, for example, points that can be used as a delivery fee for the package, points that can be used in other services, and the like.

When the priority order is assigned to the first package, the terminal device 40 may receive an input of a request to increase the priority order assigned to the first package from the first user, and output the request to the information processing device 10. The control unit 11 may update the priority assigned to the first package to a higher priority based on a request from the first user. The control unit 11 may update the estimated delivery time of the first package based on the updated priority order and output the updated estimated delivery time to the terminal device 40. The terminal device 40 may display the updated estimated delivery time. When the user determines that the first package is to be delivered by the logistics robot 30 at the updated estimated delivery time, the user inputs a delivery instruction of the first package by the logistics robot 30 to the terminal device 40. The terminal device 40 may output the delivery instruction of the first package by the logistics robot 30 to the information processing device 10. The control unit 11 may cause the logistics robot 30 to deliver the first package based on the updated priority.

The control unit 11 may update the priority assigned to the first package to a higher order based on a request from the first user, and may charge or penalize the first user when the logistics robot 30 delivers the first package based on the updated priority. The control unit 11 may output charging or penalty information to the terminal device 40 of the first user. The terminal device 40 of the first user may settle a predetermined amount of money based on the charging information or may give a penalty based on the penalty information.

The penalty may include, for example, lowering the priority at the time of delivery of the next package. The penalty may include, for example, losing the right to request a higher priority for a predetermined period of time, or may include reducing the number of times the priority may be requested to be higher once.

When the priority order is assigned to the first package, the terminal device 40 may receive an input from the first user to allow the priority order assigned to the first package to be lowered, and output the input to the information processing device 10. The control unit 11 may update the priority order assigned to the first package to a lower priority order based on an input from the first user. The control unit 11 may update the estimated delivery time of the first package based on the updated priority order and output the updated estimated delivery time to the terminal device 40. The terminal device 40 may display the updated estimated delivery time. When the user determines that the first package is to be delivered by the logistics robot 30 at the updated estimated delivery time, the user inputs a delivery instruction of the first package by the logistics robot 30 to the terminal device 40. The terminal device 40 may output the delivery instruction of the first package by the logistics robot 30 to the information processing device 10. The control unit 11 may cause the logistics robot 30 to deliver the first package based on the updated priority.

The control unit 11 may give an incentive to the first user when receiving an input from the first user to allow the priority assigned to the first package to be lowered. The control unit 11 may output the incentive information to the terminal device 40 of the first user. The terminal device 40 of the first user may give an incentive to the first user based on the information of the incentive.

The incentive may include, for example, a discount on the delivery fee of the package, or may include a cashback of the delivery fee. The incentive may include, for example, points that can be used as a delivery fee for the package, points that can be used in other services, and the like. The incentive may include, for example, increasing the priority at the time of delivery of the next package. The incentive may include, for example, granting the right to request a higher priority, or may include increasing the number of times that a higher priority may be requested once.

Operation of the Vehicle 20 and the Logistics Robot 30

The vehicle 20 may deliver the package to the logistics robot 30 at the intermediate delivery point. Transfer of the baggage may be performed unattended by the drive unit 25 of the vehicle 20 and the drive unit 35 of the logistics robot 30, or may be performed by an operator who has ridden on the vehicle 20. Vehicle 20 may unload luggage at an intermediate delivery point. The unloading may be performed unattended by the drive unit 25 of the vehicle 20, or may be performed by an operator who has ridden on the vehicle 20. The vehicle 20 can move to the next delivery location (intermediate delivery point) after delivering the package to the logistics robot 30 or unloading the package to the intermediate delivery point.

The control unit 11 of the information processing device 10 may control the vehicle 20 and the logistics robot 30 to deliver the cargo of the vehicle 20 to the logistics robot 30 when the user instructs delivery by the logistics robot 30. The control unit 11 may control the vehicle 20 to lower the package of the vehicle 20 to the intermediate delivery point when the user instructs to receive the package at the intermediate delivery point. When the user's instruction is undecided, the control unit 11 may control the vehicle 20 to unload the cargo of the vehicle 20 to the intermediate delivery point, or may control the vehicle 20 and the logistics robot 30 to deliver the cargo of the vehicle 20 to the logistics robot 30.

The control unit 11 receives an instruction to deliver the package from the user. When the user instructs delivery by the logistics robot 30, the control unit 11 controls the logistics robot 30 to deliver the package to the logistics robot 30. When the user instructs to receive the package at the intermediate delivery point, the control unit 11 stores the package at the intermediate delivery point.

When the logistics robot 30 delivers the package, the control unit 11 may output the delivery detail information to the logistics robot 30. The delivery detail information may include, for example, an address of a delivery destination of each package, information of a delivery route, and the like. If the logistics robot 30 can read the delivery destination from the display of the package, the delivery destination address may be omitted from the delivery detail information. The control unit 11 may generate the delivery route as a route that can be efficiently delivered by the logistics robot 30. For example, the control unit 11 may generate a delivery order and a travel route that collectively convey packages of the same floor or a neighboring delivery destination.

The control unit 11 may control the logistics robot 30 to unload the cargo delivered to the logistics robot 30 from the logistics robot 30 when the user does not instruct delivery by the logistics robot 30. The control unit 11 may temporarily store the cargo unloaded from the logistics robot 30 at the intermediate delivery point.

The logistics robot 30 moves in the apartment house 100 in a self-propelled manner, and delivers the package received from the vehicle 20 to a delivery destination such as the dwelling unit 121. The logistics robot 30 may deliver the package by so-called reserved delivery in which the package is placed in front of the home of the delivery destination. When the logistics robot 30 includes the output unit 37, it may notify the user of the arrival by outputting sound or the like from the output unit 37, and deliver the package by directly delivering the package to the user.

The control unit 11 may control the logistics robot 30 to cause the logistics robot 30 to deliver the package temporarily stored at the intermediate delivery point when the user instructs delivery by the logistics robot 30. The control unit 11 may control the logistics robot 30 to temporarily store the load while the load is loaded on the logistics robot 30.

After receiving the package delivered by the logistics robot 30, or after receiving the package at the intermediate delivery point, the user inputs the confirmation that the package has been received to the terminal device 40. The terminal device 40 outputs the receipt confirmation of the baggage by the user to the information processing device 10. When the receipt confirmation from the user is acquired, the control unit 11 registers that the package has been delivered, and completes the delivery operation.

Example of an Operation Sequence Related to the Delivery of a Package

Figure 6:
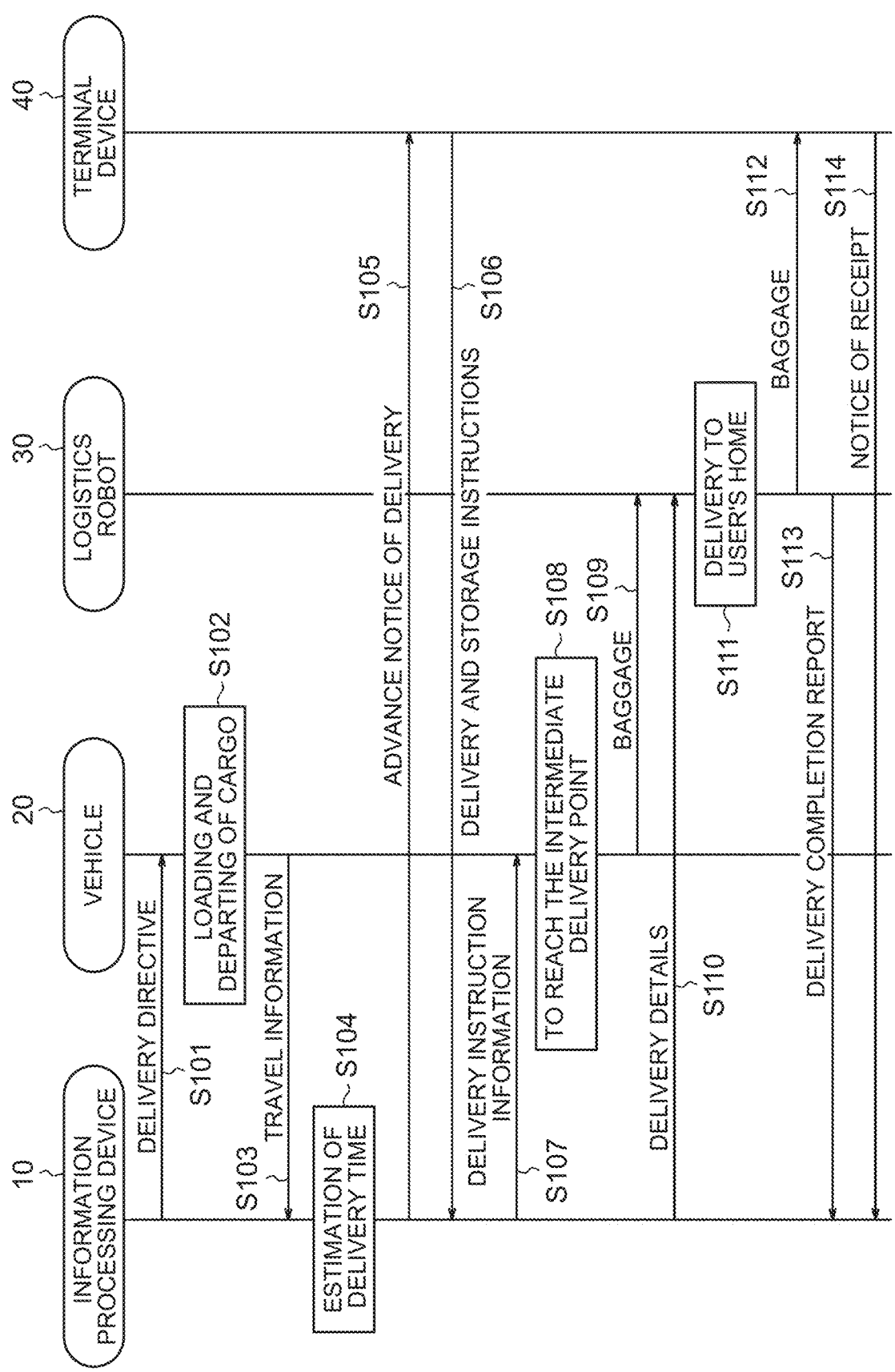
FIG. 6 is a sequence diagram for describing one embodiment of package delivery.

FIG. 6 is a sequence diagram illustrating an example of an operation procedure related to delivery of a package executed by the information processing system 1 according to the present embodiment. FIG. 6 is a sequence diagram illustrating a flow of basic processing executed by each device of the information processing system 1.

Step S101: The control unit 11 of the information processing device 10 transmits a package delivery command to the vehicles 20 via the communication unit 13. The package delivery command includes delivery information of a plurality of packages to be delivered to an intermediate delivery point in a single batch, a travel route to the intermediate delivery point, or a departure time of the vehicle 20. As the package to be delivered in one delivery batch, a package having a delivery area and a delivery date and time specification close to each other is selected. The package delivery information is information required to deliver the package to the intermediate delivery point, and includes, for example, an address of a delivery destination, a name of a user as a recipient of the package, a telephone number and an E-mail address of the user, or a package name to be delivered.

Step S102: The vehicle 20 loads the package to be delivered to the intermediate delivery point based on the delivery command received from the information processing device 10. The luggage may be loaded manually. The vehicle 20 may autonomously load a load using the drive unit 25. The parcel may be loaded at a parcel collection and delivery center, or may be loaded when the parcel is individually received from a delivery requester. After the loading of the cargo is completed, the vehicle 20 departs and moves to the intermediate delivery point based on the instructed travel route.

Step S103: The control unit 21 of the vehicle 20 transmits the travel information including the position information measured by the positioning unit 24, the velocity of the vehicle 20, and the like to the information processing device 10 via the communication unit 23. The travel information may be transmitted constantly or periodically.

Step S104: The control unit 11 of the information processing device 10 estimates a time at which the delivery to the dwelling unit of the user of the delivery destination is completed, based on the travel information received from the vehicle 20, the scheduled travel route, and the like. The control unit 11 may estimate the time at which the package arrives at the intermediate delivery point, and estimate the time at which the delivery is completed based on the estimation result. The control unit 11 may not necessarily estimate the time at which the delivery is completed based on the travel information, and may estimate the time at which the delivery is completed before the departure of the vehicle 20 based on the travel route and the road condition (congestion information or the like).

Step S105: The control unit 11 of the information processing device 10 notifies the terminal device 40 of the user in advance that the package is delivered by the logistics robot 30 via the communication unit 13. This pre-notification includes the estimated delivery time of the package (the delivery time estimated in the stepped S104).

Step S106: When the user confirms the advance notification by the output unit 45 of the terminal device 40 and accepts the delivery of the package by the logistics robot 30, the user inputs an instruction to the logistics robot 30 to deliver the package to the input unit 44 of the terminal device 40. The terminal device 40 transmits a package delivery instruction to the information processing device 10. The delivery instruction may include information specifying a time period during which the user can receive the package. If the user does not accept the delivery of the package by the logistics robot 30 and wishes to receive the package at the intermediate delivery point, the user inputs an instruction to receive the package at the intermediate delivery point to the input unit of the terminal device 40. The terminal device 40 transmits a storage instruction of the baggage to the information processing device 10.

In the sequential diagram of FIG. 6, the delivery advance notification of the step S105 and the delivery instruction or the transmission and reception of the storage instruction of the step S106 are executed after the vehicle 20 has departed. These steps may be performed prior to loading the package of step S102. Further, the delivery advance notification of the step S105 and the delivery instruction or the transmission and reception of the storage instruction of the step S106 are executed prior to the vehicle 20 reaching the intermediate delivery point (step S108). These steps may be performed after the vehicle 20 has reached the intermediate delivery point.

Step S107: The information processing device 10 transmits delivery instruction information to the vehicle 20. The delivery instruction information includes information indicating whether the user of the delivery destination has instructed the logistics robot 30 to deliver the package. The information processing device 10 may not necessarily transmit the delivery instruction information to the vehicle 20. The vehicle 20 can appropriately control the operation after reaching the intermediate delivery point based on the delivery instruction information.

S108: Vehicle 20 reaches an intermediate delivery point. In the example of FIG. 5, the intermediate delivery point is the standby space 101 of the logistics robot 30 in the apartment house 100.

Step S109: The vehicle 20 delivers the package to the logistics robot 30 at the intermediate delivery point. The transfer work of the cargo can be performed between the vehicle 20 and the logistics robot 30 unattended by using the drive unit 25 of the vehicle 20 and the drive unit 35 of the logistics robot 30. On the basis of the delivery instruction information, the vehicle 20 may not deliver the package that is not instructed to be delivered by the logistics robot 30 to the logistics robot 30, but may lower the package to the intermediate delivery point.

Step S110: The information processing device 10 transmits the delivery detail information to the logistics robot 30. The delivery detail information includes, for example, delivery information of each package such as an address of a delivery destination, or information of an efficient delivery route. That is, the delivery detailed information corresponds to an instruction to deliver the package only to the dwelling unit of the user who has instructed the delivery by the logistics robot 30, and includes information necessary for this purpose. Further, the delivery detailed information may include an instruction to handle a package that has not been instructed to be delivered by the logistics robot 30 from the user.

Step S111: The logistics robot 30 delivers the package from the intermediate delivery point to the user's dwelling unit based on the delivery detail information. The logistics robot 30 may store the package that has not been instructed to be delivered by the logistics robot 30 at the intermediate delivery point or may transport the package to the temporary storage space 103 in the apartment house 100 based on the instruction of the delivery detailed information. When the logistics robot 30 obtains information from a user instructing the delivery by the logistics robot 30 for a parcel stored at an intermediate delivery point, the parcel to the user may be delivered from the intermediate delivery point to the user's residence. The information processing device 10 may output a delivery advance notification again to a user who does not input an instruction regarding the delivery of the package.

Step S112: The logistics robot 30 delivers the package to the user (recipient). The logistics robot 30 may notify the user of the arrival of the package by an audio output from the output unit 37 or the like, and may directly deliver the package to the user.

Step S113: The logistics robot 30 transmits, although not essential, a delivery completion report to the information processing device 10 after the delivery of the package is completed. When the logistics robot 30 transmits the delivery completion report, the information processing device 10 can check the delivery with the receipt notification from the user. As a result, the reliability of the delivery is improved.

Step S114: The user enters that the package has been received into the terminal device 40. The terminal device 40 transmits the receipt notification of the baggage to the information processing device 10. The user may voluntarily input a receipt notification to the terminal device 40 and transmit the receipt notification to the information processing device 10. The information processing device 10 may transmit an inquiry notification for confirming receipt of the package to the terminal device 40. The user may transmit the receipt notification from the terminal device 40 as a reply to the inquiry notification.

Flowchart of Example Procedure for Delivery of Baggage

Figure 7:
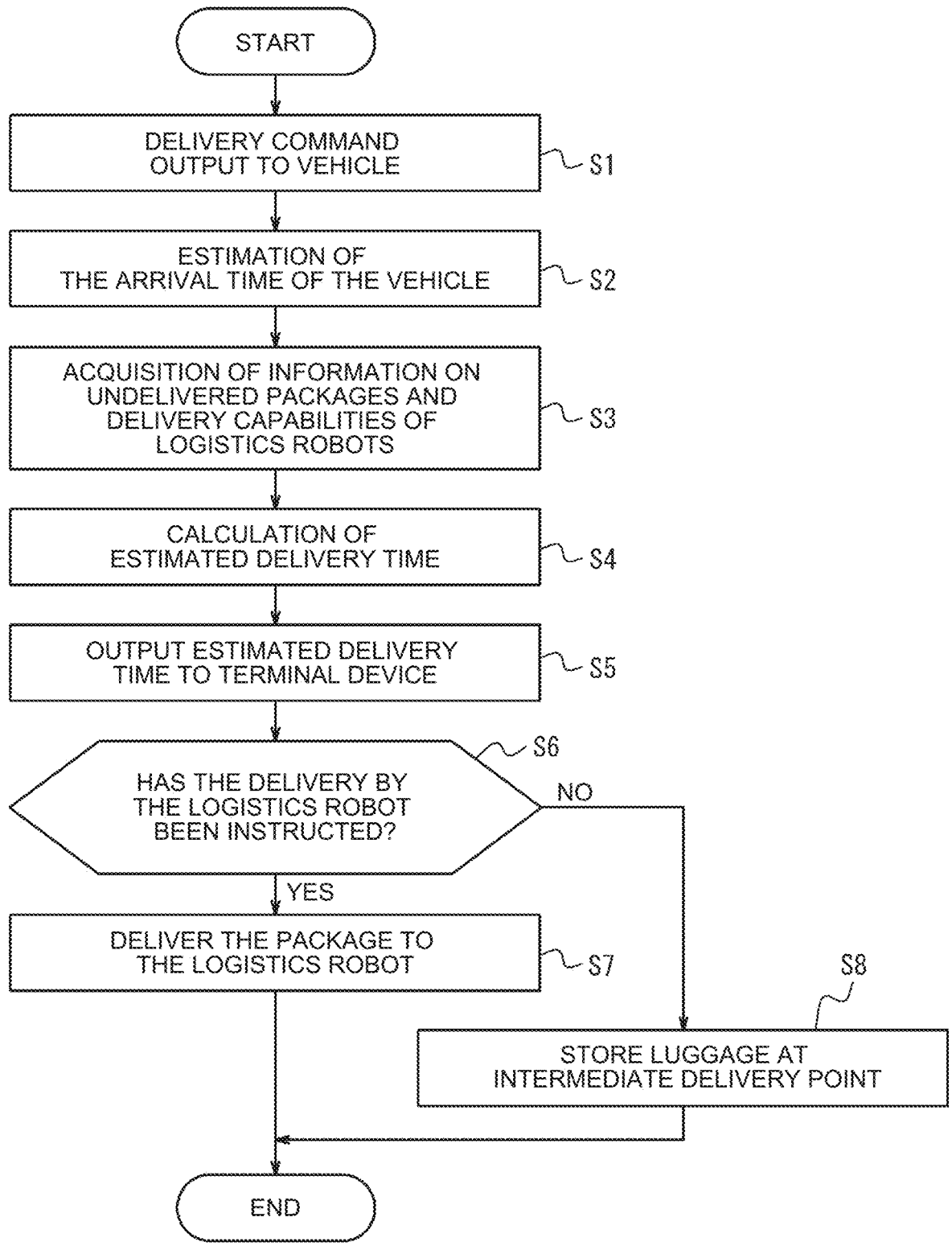
FIG. 7 is a flowchart illustrating an example of a procedure of the information processing method according to the embodiment.

The control unit 11 of the information processing device 10 according to the present embodiment manages the logistics robot 30 that delivers the baggage from the intermediate delivery point to each of the plurality of users' residences, and estimates a time at which the logistics robot 30 completes the delivery of the baggage. In order to calculate the estimated delivery time, the control unit 11 may execute an information processing method including, for example, the procedure of the flowchart illustrated in FIG. 7. The information processing method may be implemented as an information processing program to be executed by the control unit 11. The information processing program may be stored in a non-transitory computer-readable medium.

The control unit 11 issues a command to the vehicle 20 to deliver the package to the intermediate delivery point (step S1). The control unit 11 estimates the time at which the vehicles 20 arrive at the intermediate delivery point (step S2).

The control unit 11 acquires the information of the package that has not been delivered at the intermediate delivery point and the delivery capability of the logistics robot 30 (step S3). Specifically, the control unit 11 may acquire information of an undelivered package at the time when the vehicle 20 arrives at the intermediate delivery point. The control unit 11 estimates a time at which the first package that has arrived at the intermediate delivery point is delivered to the first user of the delivery destination based on the information of the undelivered package and the delivery capability of the logistics robot 30. That is, the control unit 11 calculates the estimated delivery time of the first package (step S4).

The control unit 11 outputs the estimated delivery time of the first package to the terminal device 40 of the first user (step S5). The terminal device 40 of the first user outputs, to the information processing device 10, an instruction to deliver the first package by the logistics robot 30 or an instruction to receive the first package at an intermediate delivery point. When the first user does not input the instruction, the terminal device 40 of the first user may output to the information processing device 10 that the instruction is not input.

The control unit 11 determines whether or not the delivery of the first package by the logistics robot 30 is instructed based on the input of the first user acquired from the terminal device 40 of the first user (step S6). When the delivery by the logistics robot 30 is instructed (step S6:YES), the control unit 11 causes the logistics robot 30 to deliver the first package (step S7). When the delivery by the logistics robots 30 is not instructed (step S6:NO), the control unit 11 stores the first package at the intermediate delivery point (step S8). When the delivery by the logistics robot 30 is not instructed, this includes a case where the first user receives the first package at the intermediate delivery point, or a case where the first user does not input the instruction. After executing the step S7 or S8 procedure, the control unit 11 ends the execution of the procedure of the flow chart of FIG. 7.

Small Block

As described above, the information processing device 10 according to the present embodiment notifies the terminal device 40 of the user of the estimated delivery time in the case where the package is delivered by the logistics robot 30 in advance. The user decides whether to accept the delivery of the package at the estimated delivery time by the logistics robot 30 and instruct the delivery by the logistics robot 30, and inputs an instruction to the terminal device 40. The terminal device 40 outputs the user's instruction to the information processing device 10. The information processing device 10 delivers the package to the logistics robot 30 or stores the package at an intermediate delivery point based on an instruction from the user. According to this configuration, the user can know the estimated delivery time of the package in advance, and can select the delivery mode according to the convenience of the user. As a result, user's convenience is enhanced.

Further, the information processing device 10 according to the present embodiment causes the logistics robot 30 to deliver only the package that the user has instructed to deliver by the logistics robot 30. In this way, the frequency of taking back and re-delivery of the baggage from home may be reduced. As a result, the delivery efficiency by the logistics robot 30 can be improved.

Embodiments of Delivery to Detached Houses

An information processing system 1 according to another embodiment of the present disclosure may be used to deliver a package to a user living in a detached house, as illustrated in FIG. 8. Hereinafter, a procedure for delivering a package to a user living in the house 202 or 203 will be described. It should be noted that the description that overlaps with the contents of FIG. 5 showing a mode of delivering a package to a user living in each dwelling unit of the apartment house 100 is simplified.

The vehicle 20 loads a package to be delivered to the house 202 or 203 based on a command from the information processing device 10, and moves to the intermediate delivery point 201. In the present embodiment, the intermediate delivery point 201 may be a predetermined space close to the house 202 or 203. The intermediate delivery point 201 may be any space capable of delivering a package from the vehicle 20 to the logistics robot 30. In the present embodiment, the vehicle 20 carries the logistics robot 30 to the intermediate delivery point 201. At the intermediate delivery point 201, the vehicle 20 lowers the logistics robot 30 on the road and delivers the package to be delivered to the user of the house 202 or 203 to the logistics robot 30.

The control unit 11 of the information processing device 10 notifies the terminal device 40 of the user of the delivery destination such as the house 202 or 203 in advance that the package is delivered by the logistics robot 30. The pre-notification includes an estimated delivery time of the package. The estimated delivery time may be calculated based on the travel information (position information and travel speed) of the logistics robot 30 when the distance from the intermediate delivery point 201 to the house 202 or 203 is long or when the travel speed of the logistics robot 30 is low.

The user outputs a delivery instruction from the terminal device 40 to the information processing device 10 when accepting delivery of a package to the logistics robot 30. When the user receives the package at the intermediate delivery point or desires to store the package at the intermediate delivery point, the user issues a storage instruction from the terminal device 40 to the information processing device 10.

The control unit 11 creates delivery detail information of the package based on the delivery instruction or the storage instruction from the user, and outputs the delivery detail information to the logistics robot 30. The delivery detail information includes delivery information such as an address of a delivery destination of each package, or information on a delivery route. For example, in a case where the delivery desired time designated by the user of the house 202 is earlier, the control unit 11 can set the delivery route of the logistics robot 30 so that the package is delivered to the house 202 first and then the package is delivered to the house 203.

The logistics robot 30 moves the road in a self-propelled manner based on the delivery detailed information, and delivers the baggage received from the vehicle 20 to the houses 202 and 203. The logistics robot 30 may deliver the package in a so-called place where the package is placed in front of the home of the delivery destination. When the logistics robot 30 includes the output unit 37, the arrival may be notified to the user by voice or the like, and the package may be directly delivered to the user. In the present embodiment, one logistics robot 30 sequentially delivers packages to two houses 202 and 203. Two logistics robots 30 may deliver packages to homes 202 and 203, respectively. That is, one logistics robot 30 may deliver the package to the house 202, and another logistics robot 30 may deliver the package to the house 203.

After receiving the package from the logistics robot 30, the user transmits a receipt notification from the terminal device 40 to the information processing device 10. The control unit 11 receives the receipt notification from the user and completes the delivery operation.

As described above, the information processing system 1 according to the present disclosure can be applied not only to the delivery of the package to the apartment house but also to the delivery of the package to the detached house.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, in the above-described embodiment, the configuration and operation of the information processing device 10 may be distributed among a plurality of computers capable of communicating with each other. Further, for example, an embodiment in which a part of the functions of the information processing device 10 is provided in the vehicle 20 or the logistics robot 30 is also possible.

Further, for example, an embodiment in which a general-purpose computer functions as the information processing device 10 according to the above-described embodiment is also possible. Specifically, a program describing processing contents for realizing each function of the information processing device 10 according to the above embodiment is stored in the memory of the general-purpose computer, and the program is read out and executed by the processor. Therefore, the present disclosure can also be realized as a program that can be executed by the processor or a non-transitory computer-readable medium that stores the program.

Hereinafter, some of the embodiments of the present disclosure will be exemplified. It should be noted, however, that embodiments of the present disclosure are not limited thereto.

Appendix 1

An information processing device includes a control unit that manages a logistics robot that delivers a package from an intermediate delivery point to a residence of each of a plurality of users. The control unit estimates a time at which the logistics robot completes delivery of a first package to a first user based on information on an undelivered package present at the intermediate delivery point at a time at which the first package arrives at the intermediate delivery point and a delivery capability of the logistics robot, and outputs the estimated time to a terminal device of the first user.

Appendix 2

In the information processing device according to Appendix 1, when an instruction to deliver the first package by the logistics robot is acquired from the terminal device, the control unit controls the logistics robot such that the logistics robot delivers the first package to the first user.

Appendix 3

In the information processing device according to Appendix 1, when an instruction that the first user receives the first package at the intermediate delivery point is acquired from the terminal device, the control unit controls the logistics robot such that the first package is stored at the intermediate delivery point.

Appendix 4

In the information processing device according to Appendix 3, when the first user receives the first package at the intermediate delivery point, the control unit grants the first user an incentive.

Appendix 5

In the information processing device according to any one of Appendices 1 to 4, the control unit estimates the time at which the logistics robot completes the delivery of the first package based on a priority for delivering the first package among the undelivered packages.

Appendix 6

In the information processing device according to Appendix 5, the control unit determines the priority for delivering the first package based on the information on the undelivered package.

Appendix 7

In the information processing device according to Appendix 6, the information on the undelivered package includes the number, a size, or a kind of the undelivered package.

Appendix 8

In the information processing device according to any one of Appendices 5 to 7, the control unit grants the first user an incentive when an instruction that the first user permits to lower the priority for delivering the first package is acquired from the terminal device.

Appendix 9

In the information processing device according to any one of Appendices 5 to 7, the control unit charges the first user when the priority for delivering the first package is raised based on an instruction by the first user.

Appendix 10

In the information processing device according to any one of Appendices 1 to 9, the control unit acquires the number or a capacity of the logistics robot that operates at the intermediate delivery point as the delivery capability of the logistics robot.

Appendix 11

In the information processing device according to Appendix 10, the control unit further acquires an estimation value of a time in which the logistics robot moves from the intermediate delivery point to the residence of each of the users as the delivery capability of the logistics robot.

Appendix 12

In the information processing device according to Appendix 11, the control unit sets a route in which the logistics robot is able to move preferentially in a route from the intermediate delivery point to the residence of each of the users.

Appendix 13

An information processing system includes: the information processing device according to any one of Appendices 1 to 12; the logistics robot that delivers the undelivered package present at the intermediate delivery point to the user; and a terminal device that displays an estimation result of the time at which the logistics robot completes the delivery of the first package, the estimation result being output from the information processing device.

Appendix 14

An information processing method is executed by an information processing device that manages a logistics robot that delivers a package from an intermediate delivery point to a residence of each of a plurality of users, and includes: estimating a time at which the logistics robot completes delivery of a first package to a first user based on information on an undelivered package present at the intermediate delivery point at a time at which the first package arrives at the intermediate delivery point and a delivery capability of the logistics robot; and outputting an estimation result of the time at which the logistics robot completes the delivery of the first package to the first user to a terminal device of the first user.

Appendix 15

The information processing method according to Appendix 14 further includes estimating the time at which the logistics robot completes the delivery of the first package based on a priority for delivering the first package among the undelivered packages.

Appendix 16

The information processing method according to Appendix 15 further includes granting the first user an incentive when the first user permits to lower the priority for delivering the first package.

Appendix 17

The information processing method according to any one of Appendices 14 to 16 further includes granting the first user an incentive when an instruction that the first user receives the first package at the intermediate delivery point is acquired.

Appendix 18

A terminal device is carried by a first user, and includes a control unit that acquires, from an information processing device that manages a logistics robot that delivers a package from an intermediate delivery point to a residence of each of a plurality of users, an estimation result of estimating a time at which the logistics robot completes delivery of a first package to the first user based on information on an undelivered package present at the intermediate delivery point at a time at which the first package arrives at the intermediate delivery point and a delivery capability of the logistics robot, and causes an output unit to display the estimation result acquired.

Appendix 19

In the terminal device according to Appendix 18, the control unit outputs an instruction to deliver the first package by the logistics robot to the information processing device, and outputs a receipt confirmation of the first package delivered by the logistics robot to the information processing device.

Appendix 20

In the terminal device according to Appendix 18, the control unit outputs an instruction that the first user receives the first package at the intermediate delivery point to the information processing device, and acquires information on an incentive that the first user is granted.

What is claimed is:

1. An information processing device, comprising:
a processor configured to control a logistics robot to deliver a package from an intermediate delivery point to a residence of each of a plurality of users, wherein the processor is configured to:
acquire (i) a quantity and size of undelivered packages as information on the undelivered packages existing at the intermediate delivery point and (ii) a quantity and capacity of a load that the logistics robot operating at the intermediate delivery point can load as delivery capacity of the logistics robot, to estimate a delivery time at which the logistics robot completes delivery of a first package to a first user based on the acquired quantity and size of the undelivered packages and the acquired quantity and capacity of the load that the logistics robot operating at the intermediate delivery point can load,
estimate an earlier time to complete the delivery of the first package to the first user as the estimated delivery time in response to an increase of a quantity of logistics robots at the intermediate delivery point or in response to an increase of the capacity of the load that the logistics robot operating at the intermediate delivery point can load,
output the estimated delivery time to a terminal device of the first user, and
in response to an instruction to deliver the first package by the logistics robot being acquired from the terminal device of the first user, control the logistics robot to deliver the first package to the first user based on the estimated delivery time.

2. The information processing device according to claim 1, wherein in response to an instruction that the first user receives the first package at the intermediate delivery point being acquired from the terminal device, the processor is configured to control the logistics robot such that the first package is stored at the intermediate delivery point.

3. The information processing device according to claim 2, wherein in response to the first user receiving the first package at the intermediate delivery point, the processor is configured to grant the first user an incentive.

4. The information processing device according to claim 1, wherein the processor is configured to estimate the delivery time at which the logistics robot completes the delivery of the first package based on a priority for delivering the first package among the undelivered packages.

5. The information processing device according to claim 4, wherein the processor is configured to determine the priority for delivering the first package based on the information on the undelivered package.

6. The information processing device according to claim 5, wherein the information on the undelivered package further includes a kind of the undelivered package.

7. The information processing device according to claim 4, wherein the processor is configured to grant the first user an incentive in response to an instruction that the first user permits to lower the priority for delivering the first package being acquired from the terminal device.

8. The information processing device according to claim 4, wherein the processor is configured to charge the first user in response to the priority for delivering the first package being raised based on a further instruction by the first user.

9. The information processing device according to claim 1, wherein the processor is configured to further acquire an estimation value of a time in which the logistics robot moves from the intermediate delivery point to the residence of each of the plurality of users as a delivery capability of the logistics robot.

10. The information processing device according to claim 9, wherein the processor is configured to set a route in which the logistics robot is configured to move from the intermediate delivery point to the residence of each of the plurality of users such that a time for the logistics robot to move from the intermediate delivery point to the residence of each of the plurality of users is shortened.

11. An information processing system, comprising:
a logistics robot;
a terminal device of a first user; and
an information processing device; including a processor configured to control the logistics robot to deliver a package from an intermediate delivery point to a residence of each of a plurality of users including the first user, wherein
the processor is configured to:
acquire (i) a quantity and size of undelivered packages as information on the undelivered packages existing at the intermediate delivery point and (ii) a quantity and capacity of a load that the logistics robot operating at the intermediate delivery point can load as delivery capacity of the logistics robot, to estimate a delivery time at which the logistics robot completes delivery of a first package to the first user based on the acquired quantity and size of the undelivered packages and the acquired quantity and capacity of the load that the logistics robot operating at the intermediate delivery point can load,
estimate an earlier time to complete the delivery of the first package to the first user as the estimated delivery time in response to an increase of a quantity of logistics robots at the intermediate delivery point or in response to an increase of the capacity of the load that the logistics robot operating at the intermediate delivery point can load,
output the estimated delivery time to the terminal device of the first user, and in response to an instruction to deliver the first package by the logistics robot being acquired from the terminal device of the first user, control the logistics robot to deliver the first package to the first user based on the estimated delivery time, and the terminal device is configured to display the estimated delivery time at which the logistics robot completes the delivery of the first package, the estimated delivery time being output from the information processing device.

12. An information processing method executed by an information processing device that manages a logistics robot that delivers a package from an intermediate delivery point to a residence of each of a plurality of users, the information processing method comprising:

acquiring (i) a quantity and size of undelivered packages as information on the undelivered packages existing at the intermediate delivery point and (ii) a quantity and capacity of a load that the logistics robot operating at the intermediate delivery point can load as delivery capacity of the logistics robot, to a delivery time at which the logistics robot completes delivery of a first package to a first user based on the acquired quantity and size of the undelivered packages and the acquired quantity and capacity of the load that the logistics robot operating at the intermediate delivery point can load, estimating an earlier time to complete the delivery of the first package to the first user as the estimated delivery time in response to an increase of a quantity of logistics robots at the intermediate delivery point or in response to an increase of the capacity of the load that the logistics robot operating at the intermediate delivery point can load, outputting the estimated delivery time to a terminal device of the first user; and in response to an instruction to deliver the first package by the logistics robot being acquired from the terminal device of the first user, control the logistics robot to deliver the first package to the first user based on the estimated delivery time.

13. The information processing method according to claim 12, further comprising estimating the delivery time at which the logistics robot completes the delivery of the first package based on a priority for delivering the first package among the undelivered packages.

14. The information processing method according to claim 13, further comprising granting the first user an incentive in response to the first user permitting to lower the priority for delivering the first package.

15. The information processing method according to claim 12, further comprising granting the first user an incentive in response to an instruction that the first user receives the first package at the intermediate delivery point being acquired.

16. The information processing system according to claim 11, wherein the terminal device is configured to output a receipt confirmation of the first package delivered by the logistics robot to the information processing device.

17. The information processing system according to claim 11, wherein the terminal device is configured to output an instruction that the first user receives the first package at the intermediate delivery point to the information processing device, and acquire, from the information processing device, information on an incentive that the first user is granted.

18. The information processing system according to claim 11, wherein the processor is configured to estimate the earlier time to complete the delivery of the first package to the first user as the estimated delivery time in response to the increase of the quantity of logistics robots at the intermediate delivery point.

19. The information processing system according to claim 18, wherein the processor is configured to estimate the earlier time to complete the delivery of the first package to the first user as the estimated delivery time in response to an increase of the capacity of the load that the logistics robot operating at the intermediate delivery point can load.

20. The information processing system according to claim 19, wherein the processor is configured to estimate a time that the logistics robot moves from the intermediate delivery point to the first user who lives in a dwelling unit in a building, based on a congestion state of an elevator of the building or a congestion state of a passageway of each floor of the building.

* * * * *